United States Patent [19]

Naess

[11] Patent Number: 4,529,414

[45] Date of Patent: Jul. 16, 1985

[54] METHOD AND APPARATUS FOR SEPARATION AND SEPARATE FLOW OF GAS AND LIQUID IN A FLOW SYSTEM

[76] Inventor: Erik B. Naess, Nils Lauritssøns vei 46, Oslo 8, Norway

[21] Appl. No.: 576,172

[22] Filed: Feb. 2, 1984

Related U.S. Application Data

[63] Continuation of Ser. No. 429,341, Sep. 30, 1982, abandoned.

[30] Foreign Application Priority Data

Oct. 2, 1981 [NO] Norway ................................ 813349

[51] Int. Cl.$^3$ ............................................. B01D 19/00

[52] U.S. Cl. .......................................... 55/46; 55/199; 55/466; 137/1; 138/115

[58] Field of Search ................... 55/25, 36, 40, 46, 43, 55/44, 159, 189, 199, 428, 466, 467; 137/1; 138/115, 116, 117, DIG. 9

[56] References Cited

U.S. PATENT DOCUMENTS

| | | | |
|---|---|---|---|
| 2,610,697 | 9/1952 | Lovelady | 55/174 |
| 2,657,760 | 11/1953 | Glasgow | 55/174 |
| 3,009,538 | 11/1961 | O'Dell | 55/174 |
| 3,176,446 | 4/1965 | Siggelin | 55/189 |
| 3,273,319 | 9/1966 | Jones | 55/199 |
| 3,385,031 | 5/1968 | McMinn | 55/174 |
| 3,389,536 | 6/1968 | Bull | 55/175 |
| 3,413,778 | 12/1968 | Lavery | 55/174 |
| 3,626,673 | 12/1971 | Stockton | 55/199 |

FOREIGN PATENT DOCUMENTS

| | | | |
|---|---|---|---|
| 566886 | 12/1958 | United Kingdom | 55/174 |
| 863908 | 3/1961 | United Kingdom | 55/174 |

*Primary Examiner*—Ernest G. Therkorn
*Attorney, Agent, or Firm*—Ladas & Parry

[57] ABSTRACT

A method and an apparatus for separation and separate flow of gas and liquid in a flow system, e.g. a tube system, wherein there is flowing a liquid or a liquid mixture containing gas or giving off gas as a function of time and/or variable pressure. The gas (10, 11) is permitted to separate continuously from the liquid phase (9) and thereby establish and maintain a pneumatic system in pressure equilibrium with the hydraulic system, by separation of the two phases by means of at least one permeable blocking layer (7), e.g. of textile material, which is so arranged along the length of the flow system that the heaviest medium (9) at all times will be located on that side of the blocking layer configuration (7) conditioned by gravimetrical forces, at the same time as the layer, or a configuration of layers, allows a change of the available cross-section for the essentially two phases (8, 9) along the length of the flow system, in order to compensate for variations in quantity between the phases.

4 Claims, 8 Drawing Figures

METHOD AND APPARATUS FOR SEPARATION AND SEPARATE FLOW OF GAS AND LIQUID IN A FLOW SYSTEM

This is a continuation of application Ser. No. 429,341, filed Sept. 30, 1982, now abandoned.

The present invention relates to separation and separate or guided flow of gas and liquid within a flow system, e.g. by simultaneous transportation of gas and liquid, such as oil, in a pipeline.

Within the chemical process industry, and also within the oil industry, one is often confronted with problems with varying gas accumulations within transport systems (tube systems) which are essentially dimensioned and designed on the basis of hydraulic criteria.

Within the process industry, gas accumulations may arise in a liquor transport system as a function of various vapour pressures for different components in a liquid mixture, or as a result of chemical reactions causing intermittent or continuous gas formation during transport of the liquid. One is aware of the fact that such phenomena occur, but there are no dimensioning rules by which one can compensate for the adverse effects which may arise. One is faced with problems with frequently substantially reduced capacity in a system, pulsating liquid flow, i.e. slug flow, and problems in operating pumps, intrumentation, etc.

The problems are particularly serious within the oil industry as one has most frequently a variable flow of gas and oil in the production from a well head.

It generally applies that the phenomena covered by the term "slug flow" occur when gas accumulations in a liquor during transport in a tube system have become so large that, at the prevailing pressure, an intermittent pneumatic system arises over a certain extension of the tube system. In a horizontal, straight pipe system there will be a relatively minor disturbance of the flow of the liquid. Greater disturbances occur at changes of direction, in particular in the vertical plane, when gas plugs are formed which fully or partly interrupt the liquor flow. When a gas accumulation is released in a process apparatus, tank or the like, often in connection with a simultaneous reduction of the pressure, a gas expansion takes place which involves undesired accelerations or retardations within the liquid, frequently with substantial mechanical stresses on the pipe system.

One will realize that the above mentioned problems might be avoided if one could provide for separation of the gas and the liquid in such a flow system, and guided or forced flow of one or both of the media in definite directions within the flow system.

Thus, the object of the invention is to provide a method and an apparatus which provides for separation and guided flow of a gas/liquid mixture, in two-phase or multi-phase flow, within one and the same flow system in that essentially separate, pneumatic and hydraulic flow patterns are established within the system.

To achieve the above mentioned object, there is provided a method for separation and separate flow of gas and liquid in a flow system, e.g. a tube system, wherein there is flowing a liquid or a liquid mixture containing gas or giving off gas as a function of time and/or variable pressure, which method is characterized in that the gas is allowed to be separated continuously from the liquid phase and thereby establish and maintain a pneumatic system which is in pressure equilibrium with the hydraulic system, in that the essentially two phases are separated by at least one permeable blocking layer, e.g. of textile material, which is so arranged along the length of the flow system that the heaviest medium at all times will be located on the side of the blocking layer configuration conditioned by gravimetrical forces, at the same time as the layer, or a configuration of layers, allows a change of the available, active cross-section for the essentially two phases along the length of the flow system, in order to compensate for variations in quantity between the phases.

An apparatus for carrying out the stated method is characterized in that it comprises at least one blocking layer which is permeable transversely to the flow direction and which is arranged in the longitudinal direction of the flow system so that the gas is allowed to be separated continuously from the liquid phase by movement through the blocking layer, the blocking layer, or a configuration of layers, being so arranged along the length of the flow system that the heaviest medium at all times will be located on the side of the blocking layer or layer configuration conditioned by gravimetrical forces, and the layer configuration allowing a change of the available cross-section for the various phases along the length of the flow system.

In the present invention a permeable material is utilized as a blocking layer to separate gas from liquid, and to keep these media separated, within systems in which essentially the same total static pressures prevail in both media at the same point in the system. The manner in which the pressures are generated is insignificant in this connection. The movement of the media can be from vertical to horizontal as the requirement to frictional resistance in the blocking layer will vary with the angle of the blocking layer and correspondingly with the angle of flow of the medium or media in relation to the horizontal plane. A horizontal blocking layer will require a high specific frictional resistance, i.e. a low permeability. A vertical blocking layer will require a low specific resistance, i.e. a high permeability. Between essentially horizontal and vertical extreme limits, the requirement to frictional resistance will vary correspondingly.

BRIEF DESCRIPTION OF THE DRAWINGS

The invention will be further described in the following with reference to the accompanying drawings comprising illustrating sketches for the explanation of the principles of the invention, and exemplary embodiments of devices according to the invention, and wherein.

Bubbles dispersed in a liquid in a closed flow system constitute a part of the hydraulic system, but are still independent pneumatic units. However, if several bubbles could be collected into larger units, one might manage to create pneumatic flow systems which, fully or partly surrounded by liquid, would operate with the static pressures in the liquid as the driving force.

To achieve this, the static, hydraulic pressure must be transferred to the gas, at the same time as the two media are allowed to form separate flow systems within which pneumatic and hydraulic, respectively, known flow conditions assert themselves. In general, it can be said that such conditions are uniform for gas and liquid systems. It is, however, recognized that the specific gravity and viscosity of a medium influence the fall of pressure within the respective systems and thus e.g. cause different transport velocities for said media at the same absolute pressure.

DETAILED DESCRIPTION OF THE DRAWINGS

Figure 1A:
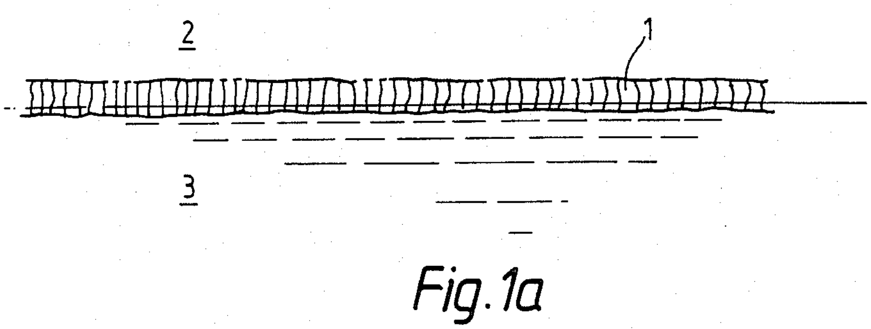
FIGS. 1*a*–1*c* show different fundamental conditions in connection with a permeable blocking layer between a pneumatic and a hydraulic system.

FIG. 1*a* shows a homogeneous, permeable material as a blocking layer 1 between a pneumatic system 2 and a hydraulic system 3 consisting of a defined liquid or a mixture of liquids. As long as there is no differential pressure between the media which exceeds the hydropneumatic frictional resistance, $F_{hp}$ (consisting of i. a. capillar forces and surface tensions), in the blocking layer 1, this will prevent the flow patterns of the systems from influencing each other.

Figure 1B:
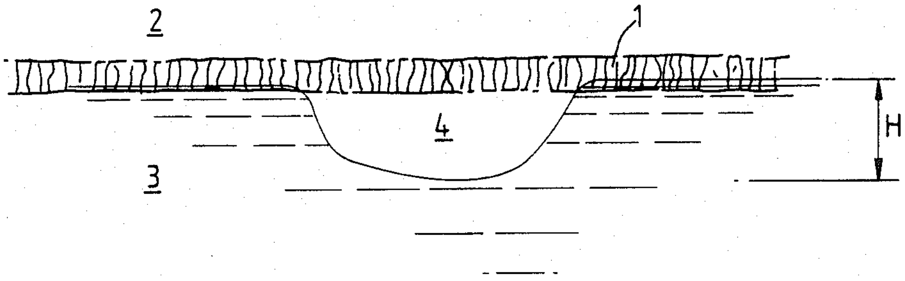

If, as shown in FIG. 1*b*, one should get a gas accumulation 4 on the liquor or liquid side 3 of the blocking layer 1, a differential pressure will arise between the pneumatic system 2 and the gas accumulation 4 which is constituted by the height H of the gas accumulation. This pneumatic differential pressure will cause the gas accumulation to migrate through the blocking layer 1 and become a part of the pneumatic system when $H > F_{hp}$.

Figure 1C:
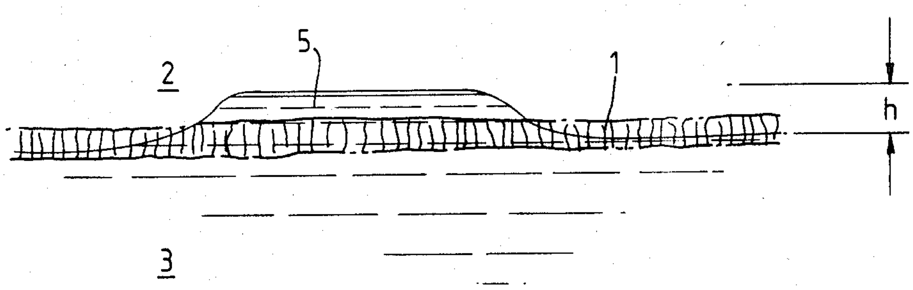

In a corresponding manner a liquid accumulation 5 above the blocking layer 1, as shown in FIG. 1*c*, will cause an additional hydraulic pressure, in principle corresponding to the height h of the liquid accumulation. The differential pressure will cause the liquid to migrate through the material 1 until hydropneumatic equilibrium is reestablished. This will happen provided that velocities in the pneumatic system do not cause entrainment and disintegration of the liquid into particles which can be conveyed pneumatically. This will, however, happen even with moderate velocities, so that a pneumatic transport pattern will arise in a humid boundary layer.

The above conditions form the basis of the method provided according to the invention for the control of a multi-phase flow, with which one generally means the flow of a gas, a gas/liquid mixture and a liquid or liquid mixture (composite regimes) within one and the same system or apparatus, e.g. a pipeline.

In the following there will be described apparatuses for carrying out the method according to the invention.

Figure 2A:
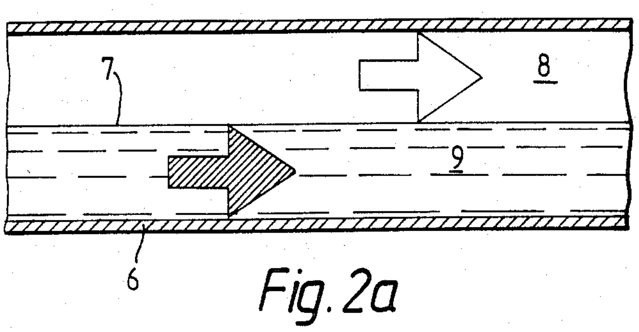
FIGS. 2*a*–2*c* show an apparatus according to the invention represented by a conduit constituting a fundamental, divided flow system with separation and guiding of a gas-oil mixture.
Figure 2B:
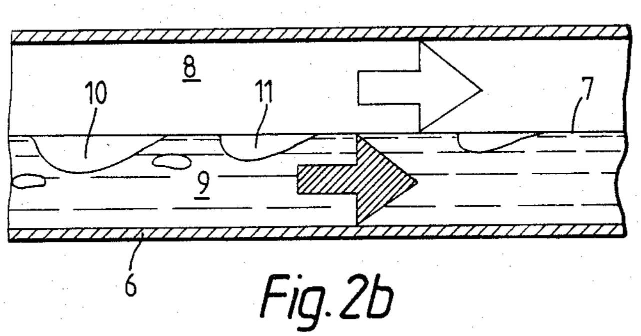
Figure 2C:
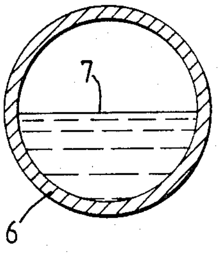

An apparatus for separation and separate flow of a gas/oil mixture, a two-phase flow, within one and the same system is shown schematically and in principle in FIGS. 2*a*–2*c*. The Figures show a section of a pipeline 6 in longitudinal and cross-sections, in which a permeable blocking layer 7 separates a quantity of gas 8 and a quantity of oil 9 flowing in the direction indicated by the arrows. FIG. 2*b* shows how gas accumulations 10 and 11 ascend towards the blocking layer 7 under the influence of the acting gravimetrical forces and migrate therethrough, the blocking layer being dimensioned and arranged in accordance with the aforementioned principles.

In the case of a pipe system with changes of direction, the blocking layer or a configuration of layers must be disposed and oriented in such a manner that the heaviest medium at all times will be located on the side of the blocking layer conditioned by gravimetrical forces, e.g. in that the blocking layer or layer configuration is given a helical shape in a 180° conduit bend in the vertical plane.

The example according to FIGS. 2*a*–2*c* shows only one permeable blocking layer, but in practice one can envisage several layers with different permeabilities dependent on the viscous properties of the liquid phase which will influence the hydropneumatic friction conditions across the layers. The blocking layer 7 is shown in the centre of the tube 6, but other positions and configurations may very well be contemplated depending upon the quantities of the different phases which are presupposed to be conveyed.

Within the oil industry one operates with GOR numbers (Gas/Oil Ratio) which may vary considerably, e.g. 1/50, 1/300, 1/1000, etc. The conditions for function are that pressure equilibrium prevails between the two phases at any point in the flow system, and that the blocking layer and the fall of pressure across the layer is dimensioned in such a way that the difference in velocity between the two media does not cause a return of gas through the material to the liquid phase. Consequently, the structure and/or configuration of the blocking layer should be such that one achieves flexibility essentially only transversely to the direction of movement, so that the available cross-section for the two phases can be varied automatically within given limits.

Figure 3A:
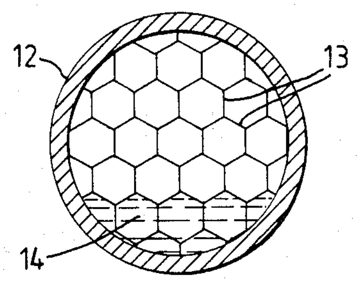
FIGS. 3*a* and 3*b* show a further example of a tube for two-phase flow wherein the permeable material is fixed within the tube in a honeycomb-pattern configuration.
Figure 3B:
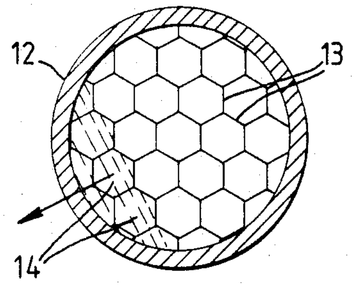

FIGS. 3*a* and 3*b* show an additional exemplary embodiment of a tube 12 for a two-phase flow in which the permeable material 13 is fixed within the tube in a honeycomb-pattern configuration. In the illustrated tube cross-section the arrangement is shown quite schematically. Apart from having optimal properties with respect to strength, this pattern will cause the flow regimes, which might arise between the quite hydraulic and the quite pneumatic system, to appear in the channels forming the boundary zone between said systems. Thus, in this connection one can speak about a multi-phase system which is in pressure equilibrium.

On horizontal runs the conveyed liquid mixture will be located in the lower part of the tube 12. At directional changes in the horizontal plane, the liquid phase 14 will be displaced through the layers and be located along the periphery of the tube 12 at an angle to the vertical which will be determined by the occuring gravitational and centrifugal forces.

At a change of direction from horizontal to vertical pipe laying, one will also get a distribution of the liquid along the periphery of the tube 12 outside of the central part of the honeycomb pattern which will convey the gas phase in vertical transport.

I claim:

1. A method for achieving separation and separate flow of gas and liquid in a transportation system using tubular flow wherein there is flowing a liquid or a liquid mixture containing gas or giving off gas as a function of time and/or variable pressure, said method comprising the steps of allowing said gas to be separated continuously from the liquid phase thereby establishing and maintaining a pneumatic system in pressure equilibrium with the hydraulic system, the gas passing through at least one permeable blocking layer separating the essentially two phases along the length of the transportion system, allowing the heaviest medium to be located at all times on that side of the blocking layer configuration conditioned by gravimetrical forces, and allowing the blocking layer, or configuration of layers, to change its position in the flow system and thereby change the available, active cross-section for the essentially two phases, to compensate for variations in quantity between the phases along the length of the transportation system.

2. An apparatus for achieving separation and separate flow of gas and liquid in a transportation system using tubular flow wherein there is flowing a liquid or a liquid mixture containing gas or giving off gas as a function of time and/or variable pressure, comprising at least one blocking layer, which is arranged in the longitudinal direction of the transportation system using tubular flow and is permeable transversely to the flow direction so that the gas is allowed to be separated continuously from the liquid phase by movement through the blocking layer, the blocking layer, or configuration of layers, being so arranged along the length of the flow system that the heaviest medium at all times will be located on that side of the blocking layer or layer configuration allowing a change in the available, active cross-section for the different phases along the length of the transportation system.

3. An apparatus according to claim 2, wherein said blocking layer is of textile material.

4. An apparatus according to claim 2 or 3, wherein the transportation system using tubular flow is a conduit and the blocking layer is fixed in the conduit in a honeycomb-pattern configuration.

* * * * *